United States Patent

[11] 3,567,151

| [72] | Inventors | Allan E. Williams<br>Mellen;<br>Royal C. Cady, Highbridge, Wis. |
|---|---|---|
| [21] | Appl. No. | 832,806 |
| [22] | Filed | June 12, 1969 |
| [45] | Patented | Mar. 2, 1971 |
| [73] | Assignee | Universal Oil Products Company<br>Des Plaines, Ill. |

[54] HANDLING SYSTEM FOR VENEER REELS
11 Claims, 7 Drawing Figs.

[52] U.S. Cl. .................................................. 242/79,
198/27, 198/33, 214/16.4
[51] Int. Cl. .................................................. B21c 47/24
[50] Field of Search .................................................. 198/19;
242/79; 214/16.4

[56] References Cited
UNITED STATES PATENTS

| 3,219,206 | 11/1965 | Cocker ........................ | 214/16.4 |
| 3,392,854 | 7/1968 | Yamashita ................... | 214/16.4 |
| 3,393,881 | 7/1968 | Nash ............................ | 242/79 |
| 3,438,593 | 4/1969 | Reed ........................... | 242/79 |

Primary Examiner—Evon C. Blunk
Assistant Examiner—Douglas D. Watts
Attorneys—James R. Hoatson, Jr. and Philip T. Liggett ABSTRACT: An automatical operating track and conveyor system for handling wood veneer reels. The system includes a turntable on a laterally movable carriage such that a full reel may be turned 180° for suitable "unreeling" positioning, power operated transfer wheels for lifting a full reel into the final "unreeling" position, power operated lifting arms for moving empty reels onto an empty track, and means to convey and return an empty reel back to the "reeling" position for receiving veneer from the log cutting lathe.

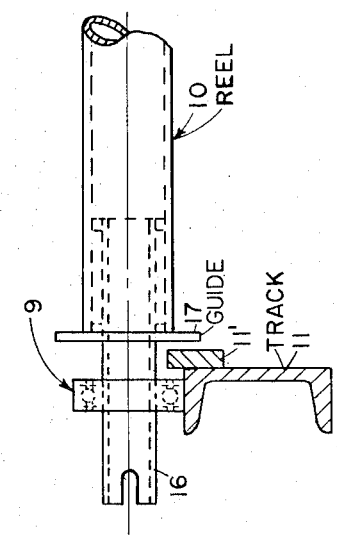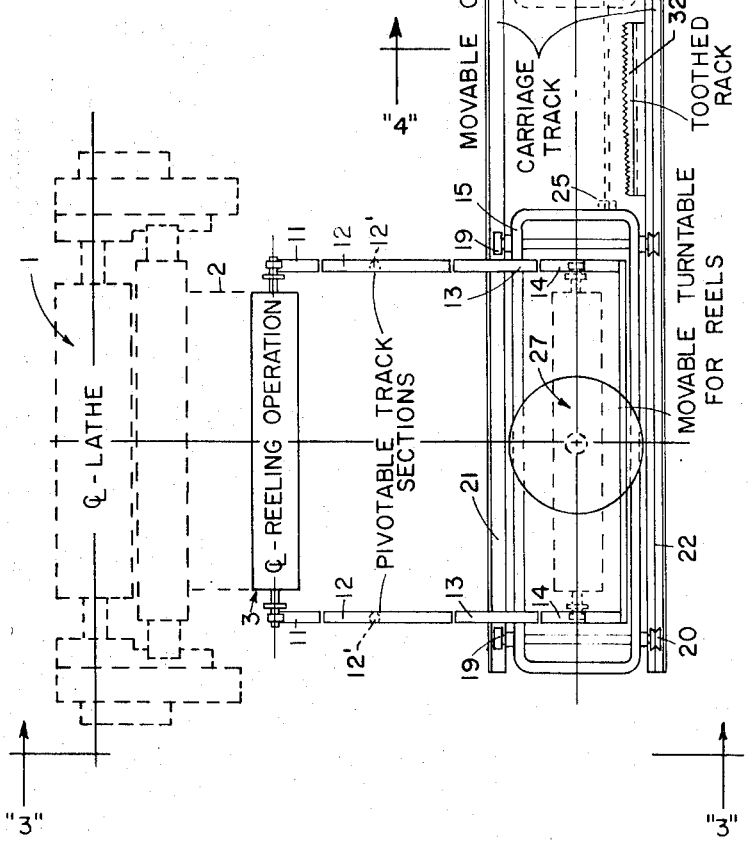

INVENTOR:
ALLAN E. WILLIAMS
ROYAL C. CADY
BY:
ATTORNEYS

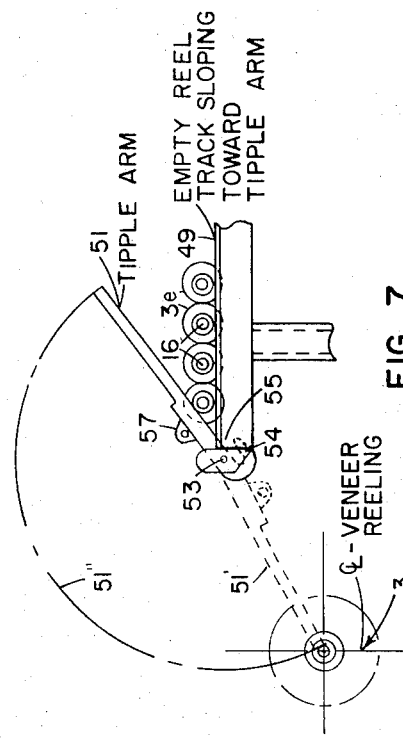
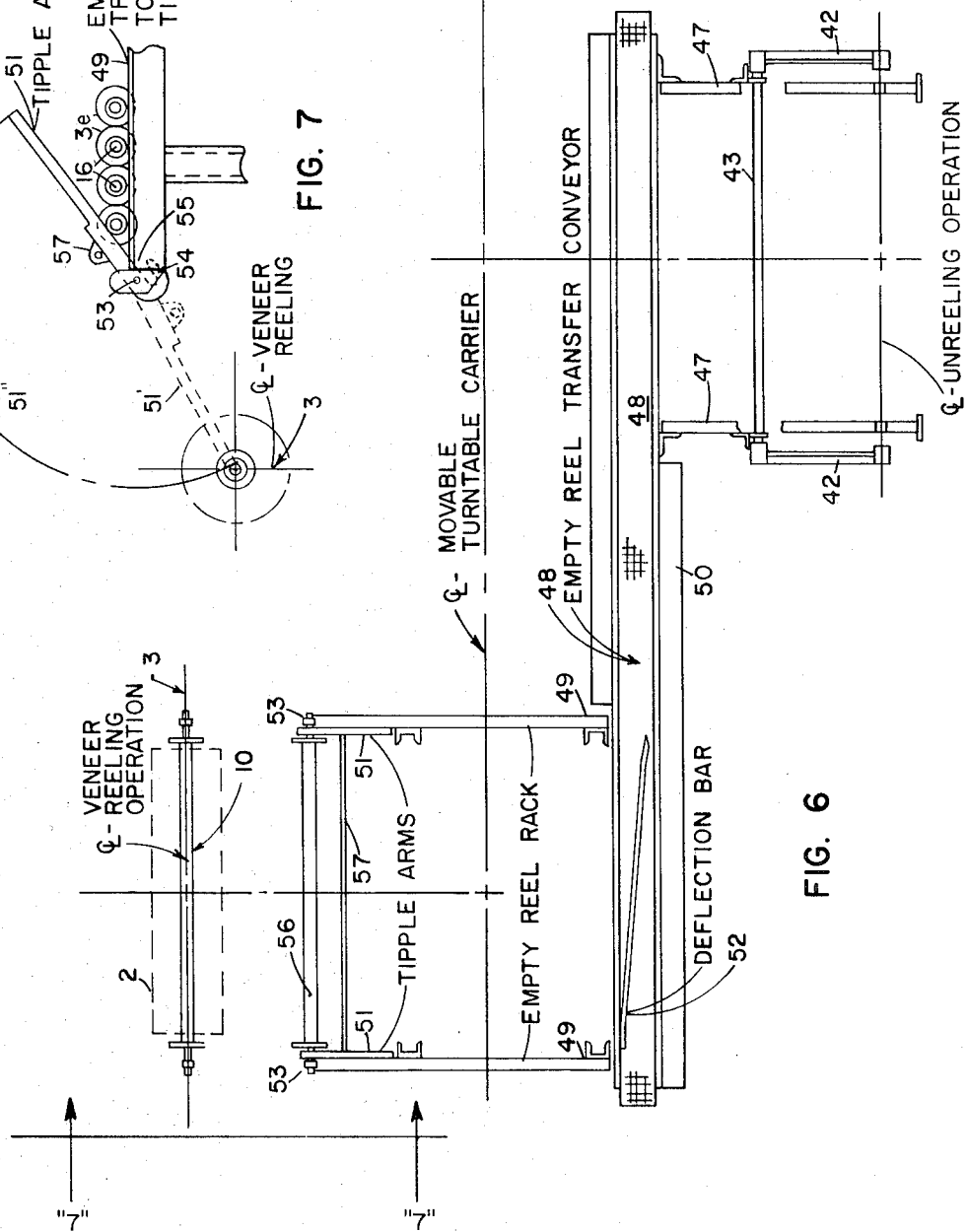

HANDLING SYSTEM FOR VENEER REELS

The present invention relates to an improved automatic system for handling filled reels and empty reels from a veneer "reeling" zone to an "unreeling" zone and from the latter back to the reeling zone.

More specifically, the invention is directed to the use of reels having roller or ball bearing wheels at their end portions so that the reels may be easily rolled on track means to and from the reeling and unreeling zones and, in addition, there are used various power operated moving, turning, and lifting means in combination with the track arrangements so that all transferring of reels is accomplished without the need of overhead hoist equipment.

In carrying out the manufacturing of veneers, there may be the initial handling of the thin cut veneer strip leaving the lathe such that it is rolled out onto conveyor means to carry it to a cutter or "clipper"; however, more customarily, the veneer is wound onto an empty reel and there is a transfer of a filled reel to a different zone for controlled unreeling and cutting into desired sized sheets or strips. As soon as one reel is filled and removed from the reeling zone, there is a replacement with an empty reel so as to keep the lathe in operation as much as possible. In a similar manner, it is desired to move an emptied reel from an unreeling zone as quickly as possible and then put in place a filled reel so that the cutting operations can be kept going at a continuous highly efficient rate. Typical veneer producing plants have made use of conveyor systems to move "roundings" from the lathe zone and to pick up trimmings from various cutting and veneer handling zones; however, the lifting, transferring, and general handling of reels in the production system has been carried out by overhead hoist means and there has not been the proper use of mechanized or automated lifting means or reel moving means so as to give good overall production efficiencies.

Since a "roundings" conveyor is customarily placed in line with the output side of a veneer cutting lathe to receive the log trimmings, it necessitates the placing of the veneer reeling zone adjacent the pickup end of this roundings conveyor. As a result, it becomes necessary to require the movement of filled reels over the roundings conveyor and/or the ultimate transverse movement of filled reels to an unwind or unreeling zone that is located out of alignment with the roundings conveyor. This lateral transfer also generally involves a 180° turn of each of the filled reels so that they will end up in a desired position for unreeling the veneer onto a conveyor which will extend substantially parallel with the roundings conveyor.

From the foregoing, it may be seen that it may be considered a principal object of this invention to provide an improved system for effecting the handling of veneer reels used in the reeling and unreeling of wood veneer in association with the cutting of veneer from logs.

It may also be considered an object of this invention to provide a veneer reel transfer means which includes track and turntable means that permits full reel transfer over and away from a roundings conveyor to reach a filled reel storage section.

Another object of this invention is to utilize automatic power operated means to effect the placement of filled reels and removal of empty reels from the unreeling position.

A still further object of this invention is to provide an empty reel return portion to the system which includes track and conveyor means at a level up and over the filled reel transfer means.

Still other objects and advantages will be set forth hereinafter in connection with the description of certain specific aspects of the system.

Broadly, the present invention is directed to a system for the handling of veneer reels where they are used for receiving a facing for veneer plywood from a veneer cutting lathe in a reeling zone, resulting filled reels are transferred to an unreeling zone and emptied reels are transferred back to the veneer reeling zone, with such system comprising in combination: (a) utilizing a wheel with antifriction bearings adjacent each end of each reel used in said system, whereby the reels may be easily rolled on track means having track spacing to engage such wheels, (b) power operated full reel lift means adjacent the reeling zone with such means adapted to lift a filled reel from such zone and have the wheels on the ends of the reel roll onto a first portion of track means, the latter extending to a carriage section, (b) said carriage section having an upper reel support portion with a short track means and reel-stop means to thereby receive a filled veneer reel and hold it thereon, (d) rollers attached to the lower portion of said carriage section, with such rollers in turn spaced to engage carriage track means positioned to extend substantially transverse with respect to the full reel movement from the reeling zone, (e) said carriage track means extending to a receiving end of a filled reel storage track, (f) power means connecting to said carriage section to move the latter on said carriage track means to a stopped position for a filled veneer reel on said carriage section providing alignment of the reel with the receiving end of said filled reel storage track, (g) a lifting means in combination with said upper support portion of said carriage section and said carriage track means effective for dislodging and rolling a filled reel from said support portion to said filled reel storage track as the filled reel reaches alignment therewith, (h) power operated full reel lifting means adjacent a discharge end of said storage track, with such lifting means having movable dislodging means to fit under each end of a stored reel and effect a periodic transfer of a filled reel to an unreeling position, and (i) power operated empty reel lifting means adjacent the unreeling position, with such means having movable arm means providing for the lifting of empty reels from such position whereby empty reels may be removed therefrom and returned to said veneer reeling zone.

Various types of wheels shall be placed at each end of each reel so that even filled reels may readily roll on the track arrangements, with very little push, or by gravity in those instances where the track is sloped. The antifriction bearings in the end wheels for the reels may be of the ball bearing type or of the roller bearing type and it is not intended to limit the present improved reel moving system to any one type of bearing. Also, the various spaced apart track sections will generally make use of structural channels, angles, etc., which will have horizontal flange sections adapted to receive and accommodate the bearing surface of each wheel for each end of the veneer reels. There may be guide flanges or other means in combination with the reels to insure that each reel stays on the track means although, alternatively, or in addition, there may be suitable guide means on the back of each track member so that the wheels of each reel are more readily retained on the spaced apart track sections.

A usual reel handling system also embodies the need for turning each filled reel approximately 180°, or end-for-end, such that there may be a subsequent unreeling of the veneer from the filled reel in a direction permitting the veneer to pass out onto a continuously moving conveyor belt. Thus, the present system incorporates a full reel carriage arrangement which permits the movement of a filled veneer reel away from the zone of the reeling operation and in a direction transverse with respect to the roundings conveyor so that there may be alignment with an "unreeling" zone and a conveyor means extending therefrom to handle the cutting and clipping of the unreeled veneer. Also, in accordance with a preferred embodiment of the present invention, there may be an automatic turntable arrangement embodied within the movable carriage system so that as the carriage moves in a transverse direction with a supported filled reel there will be the turning of an intermediate turntable means and a resulting 180° turn of the filled reel on the carriage as it approaches a track section adapted to handle the filled reels and move them to an unreeling zone.

A preferred embodiment also utilizes a power operated lifting means at the end of the full reel storage track so that each successive filled reel may be periodically moved into the unreeling position without the need of overhead hoist equipment. In one embodiment there will be the use of spaced notched wheel sections which are adapted to receive extended end portions of each veneer reel and lift the reel from the track into the unreeling position. Of course, as each filled reel completes the unwinding of the veneer onto an adjacent conveyor belt there is the need to lift the empty reel out of the unreeling position and transfer it to an empty reel transfer means for returning all the empty reels to the reeling position adjacent the lathe. Thus, in a preferred embodiment, there is an interaction between power operated lifting arrangements which are adapted to lift each empty reel out of position at the unreeling zone and substantially simultaneously effect the pickup of a filled veneer reel off of the storage track for transfer into the unreeling position. Also, as a result, each of the lifting means shall utilize suitable power operated driving means in combination with lifting wheels, arms, etc. that are along side each portion of the filled reel storage track and are spaced apart to permit clearances between any movable sections as such sections go through their lifting operations and subsequent return movements.

Generally, the filled reel transfer system, including the track means and the transverse carriage means, will be constructed and arranged so that the track and carriage means are on substantially the same level, or will move the reels in the same horizontal plane, in order to preclude the lifting or rolling up and down of the various filled reels. Also, in a preferred arrangement, the empty reel track and conveyor system will generally be on substantially the same horizontal plane, with the empty reel track sections being spaced parallel with and above the filled reel track sections whereby the empty reels may be returned from the unreeling zone back to the reeling zone. Likewise, the transverse empty reel conveyor means which will provide for the transverse movement of each reel between track sections shall be arranged in an upper level which is substantially parallel with and above the zone of the transverse carriage track and filled reel carriage means.

One embodiment of the veneer reel handling system and variations which may be made in connection therewith, as well as the many advantages obtained from the use of automatic power operations in connection with reel movement, will be more apparent upon reference to the accompanying drawings and the following description thereof.

DESCRIPTION OF THE DRAWING

FIG. 1 of the drawing is a diagrammatic plan view of the full reel transfer track and carriage system for moving filled reels from a reeling operation to an unreeling zone.

FIG. 2 is a partial sectional view through a portion of typical track section and one end portion of a veneer reel with a roller bearing wheel.

FIG. 6 of the drawing is a diagrammatic plan view indicating the positioning and arrangement of the superposed empty reel return track means and the empty reel transfer conveyor, all of which is superposed at a level above the filled reel transfer means.

FIG. 7 of the drawing is a partial elevational view, as indicated by line 7–7 in FIG. 6 showing the use of a tipple arm arrangement to transfer empty reels back to the veneer reeling position.

Figure 3:
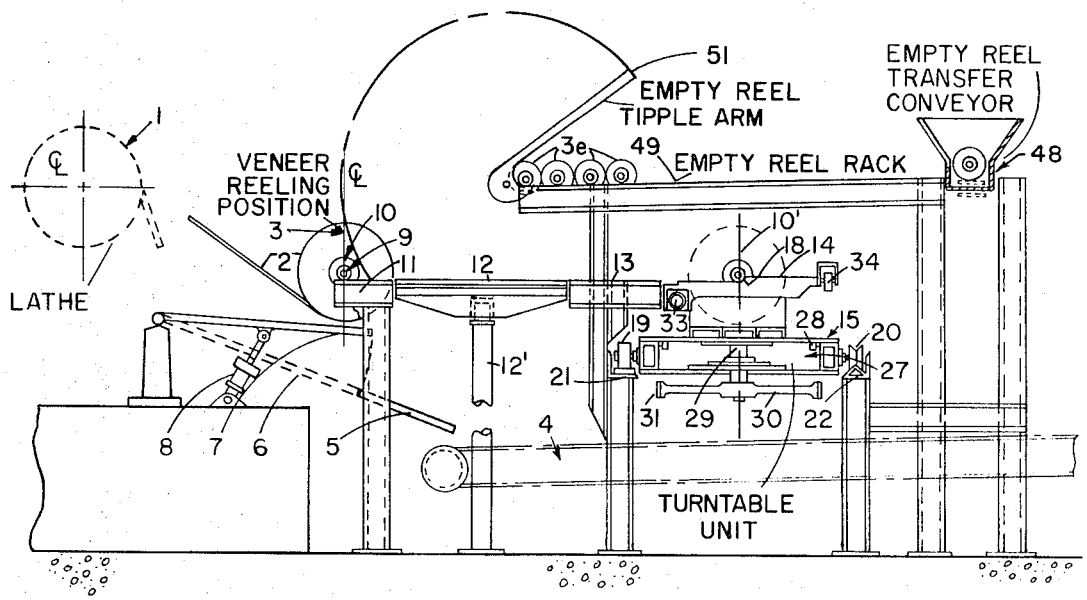
FIG. 3 is an elevational end view of the filled reel handling system, indicated by the line 3–3 in FIG. 1, as well as the added indication of a portion of the empty reel return track to the reeling zone, which may be superposed over the filled reel track section.

Referring now particularly to FIGS. 1, 2 and 3 of the drawing, there is shown, in a dotted line positioning, a lathe and a support means at 1 where there will be the peeling of a thin veneer 2 onto a reel 10 at a fixed veneer reeling position 3. Generally, the veneer reeling position will have power operated rotating means (not shown) which is adapted to effect the rapid winding of the thin veneer onto an empty reel as the veneer is cut by the lathe means 1; however, such operations are conventional and need not be shown in detail in connection with the present improved reel handling system. Also, generally there will be the utilization of a roundings conveyor 4 (as best shown in FIG. 3) which is placed in front of, or in alignment with, the veneer reeling position 3 so that trimmings and cuttings from the log within the lathe means 1 can be rapidly and automatically picked up from the lathe cutting zone. In this instance, the cuttings may be shunted onto the roundings conveyor 4 by a fixed trough means 5 and by movable guide means 6 placed below the zone of the reeling position 3. Also, there is shown, in this instance, the utilization of movable or pivoted type lifting arm means 7 with power lift means 8 that will be effective in rising under a filled reel at position 3 and lift the latter out of its positioning sockets such that antifriction wheels 9 at each end of a veneer reel 10 will roll onto and along a track section 11, as well as subsequent track sections 12 and 13, to reach a central and upper support portion 14 of a carriage section 15.

As best shown by the FIG. 2, each end of a reel 10 will have a wheel member 9 which is preferably of an antifriction bearing type construction permitting a filled reel to move on track means with very little effort. Various constructions may be used for the veneer reels, however, generally each reel will comprise an elongated tubular section which is of the order of 3 inches to 4 inches in diameter, while at each end there will be a projecting smaller tubular portion 16 of the order of 2 inches to 2½ inches in diameter and adapted to hold an antifriction bearing wheel member 9. Also, each end of each reel may have a suitable circular member, such as 17, which will assist in guiding the winding of the cut veneer strip onto the reel, as well as provide the holding of each reel on the spaced track sections. In each instance, the track sections will be spaced apart a distance to suit the reel width that is used in the system and will generally comprise standard rolled channel or angle sections which are of sufficient strength to accommodate the handling of heavy veneer filled reels. FIG. 2 diagrammatically indicates a portion of track section 11 to be of a structural channel section with an added guide strip 11' extending a short distance thereabove and welded to the back of the channel so as to provide a wheel-holding edge portion.

In the case of track sections 12, as best shown by FIGS. 1 and 3, there is provision to permit each of the spaced apart sections 12 to pivot on post means 12' whereby there may be a working platform at the zone of the reeling operation 3 and convenient means for workmen on such platform to walk through the zone of each of the track sections 12 during a veneer reeling operation or at such time as a workman is effecting the replacement of an empty reel into the reeling position. In other words, the pivoted track sections 12 need only be in their spaced parallel arrangement at such times as a filled veneer reel is being lifted and rolled out of the reeling position toward the filled reel transfer carriage zone. Where desired, automatic power means or automatic spring biased positioning means may be connected to and combined with each of the spaced pivoted track sections 12 so that they will readily move into and out of their parallel positioning, as may be desired by the workmen in the area.

As best noted in FIG. 3, a filled reel will be lifted out of the reeling position 3 and moved across track sections 11, 12 and 13 so that the filled reel can enter or move onto a carriage support section 14 and come to rest against a stop means at 18 where it is centered axially above the midportion of a lower carriage means 15. The carriage 15 may have various types of construction but preferably comprises suitable under carriage or framing means with extended and spaced apart roller means 19 and 20. The latter are adapted to, respectively, ride along spaced track sections 21 and 22. In the embodiment shown, the wheels 19 on one side of the carriage are adapted to ride along a flat upper surface of track means 21, while wheels 20 on the other side of the carriage are of a grooved construction adapted to move on a ridged or angular form track means 22. The grooved roller arrangement insures the alignment of the entire carriage 15 on the transverse track means during such periods that the movable carriage 15 is moved along the tracks 21 and 22 from one position to another. Also as best shown by FIG. 1 of the drawing, there is a motor operated power supplying wheel at 23 which operates a chain, cable, or other type pulling means 24 that connects with the carriage at 25 such that there may be the back and forth movement of the carriage means 15.

In an arrangement where the filled reel transfer carriage system would provide for the movement of a filled reel to an unreeling position adjacent the lathe zone or to an unreeling position which would have a veneer conveyor system which would move the unwound veneer in a direction toward the lathe zone or at the side of such zone, there would be no need to effect a 180° turn of a filled reel. However, in a more conventional handling operation, there will be necessitated the 180° turning of each filled veneer reel so that the unreeling operation can transfer the veneer outwardly onto a conveyor moving in a downstream arrangement with respect to the lathe or, stated another way, onto a conveyor which moves in a direction that is the same as that of the roundings conveyor from the lathe operation.

Figure 4:
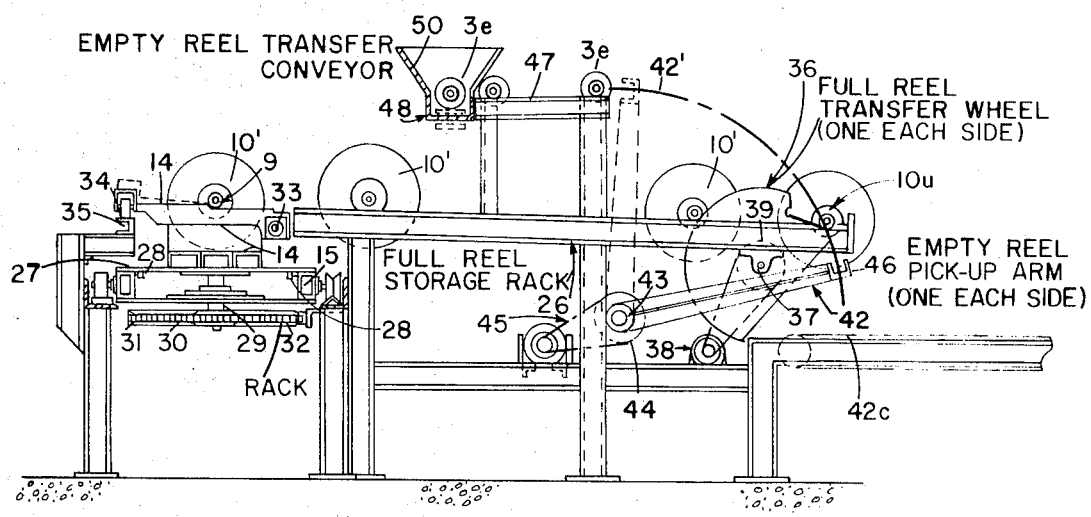
FIG. 4 is a partial sectional elevational view, as indicated by the line 4–4 in FIG. 1, as well as the additional indication of a superposed portion of the empty reel return track and transfer conveyor system.

Thus, as best shown in FIGS. 1, 3, and 4, there is a turntable arrangement in combination with the transfer carriage 15 such that the superposed filled reel on upper portion 14 may be rotated through 180° during the carriage transverse movement from the track section 13 to a more remote, but usually parallel track section, such as 26, which is adapted to receive and store filled veneer reels. Diagrammatically, there is indicated a suitable turntable unit 27 on rollers 28 and a center pivot portion 29, The rollers 28 are mounted from short shaft means connecting to the carriage 15 whereby there will be a relatively low friction 180°± turning of the turntable plate section 27, as well as the superposed upper support portion 14.

Various methods may be utilized to effect the turning of the upper support portion 14 along with the turntable section 27 above carriage section 15; however, in a preferred simplified embodiment, there is made use of a turntable drive wheel 30 from the bottom of shaft 29 and having peripheral teeth 31 in turn adapted to engage a toothed rack 32 that is mounted along the side of the midportion of one of the track sections, such as 22. This arrangement provides for the automatic turning of turntable 27 through the center shaft means 29 by virtue of having the teeth 31 of drive wheel 30 engage the fixed rack portion 32 as the carriage 15 is pulled along the length of the carriage track means 21 and 22, with the movement of the carriage, of course, being provided by the power operated cable 24. In other words, this arrangement obviates the need of a separate motor or other power supply means to effect the half-rotation of the turntable 27 on carriage means 15 and the resulting end-to-end reversement of a filled veneer reel prior to its reaching alignment with the full reel storage rack 26. The teeth of drive reel 30 and the fixed positioned toothed rack 32 also provides for the reversing operation of the turntable 27 as the entire carriage section 15 is moved back to its original position for alignment with track sections 13.

Also, in combination with the upper support portion 14, above the lower carriage 15, there is provided automatic means for lifting a filled reel from such upper support portion so that each filled reel may be readily moved onto the elevated storage track 26. Obviously various lifting mechanisms may be utilized in combination with reel supporting means to effect the dislodgment of a filled reel from the (of transfer carriage 15) upper portion 14; however, again the present invention uses a simplified embodiment which permits each transversely moved filled reel to be automatically lifted and moved off of the carriage as it reaches alignment with the storage track section 26.

As best shown in FIGS. 1, 3 and 4, there is provided a liftable upper support portion 14 through the use of pivoting means at 33 and a guide wheel means 34 adapted to roll onto a short inclined track section 35. For example, as noted in FIG. 3, the lifting wheel 34 on upper support portion 14 is on the right-hand side of the filled reel 10' as it rests in the center of such portion 14. However, as will be noted in FIG. 4, after there has been a 180° turning of turntable 27 and the upper support portion 14, the same lifting wheel 34 is on the left-hand side of the carriage section, as shown in the present drawings, and such wheel 34 is in an aligned position to ride up the short inclined track section 35, which is indicated in both FIGS. 1 and 4. Also, as best shown by FIG. 4, as the wheel 34 rides up the sloped track section 35, there is a lifting of the entire one side of track sections 14 about pivot point means 33 and a resulting dislodgment of the filled reel out of its temporary position along the center axis of the carriage 15 whereby the end wheels 9 at the ends of the reel will roll across the lower portions of support 14 and onto adjacent receiving end portions of full reel storage track 26. Thus, each full reel 10' can be rolled onto the storage track 26 and held there in readiness for the unreeling operation at the opposite end of the track section 26.

It is to be noted that various types of upper support sections 14 may be utilized above the turntable means and the transverse carriage section 15; however, again, the lifting wheel and inclined track arrangement, in combination with the pivoted support 33 for upper portion 14 does provide for the automatic lifting of the latter as the power operated chain 24 pulls the carriage section 15 toward the zone of the storage track section 26. There is thus obviated the need of other separate power equipment to provide for the lifting of a filled reel from its axial position and move it on to the storage track section 26. The return movement of the carriage 15 to its original reel receiving position will again lower the upper support portions 14 to a substantially horizontal position so that they are in proper positioning and arrangement for the receiving of the next filled veneer reel from aligned track sections 13.

Figure 5:
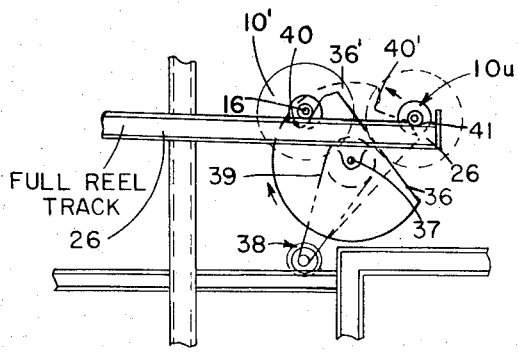
FIG. 5 is a partial elevational view, as indicated by the line 5–5 in FIG. 1 showing the operation of one of the transfer reel means for lifting a filled reel to the unreeling position.

Referring now particularly to FIG. 4 of the drawing, as well as FIG. 1, there is shown the utilization of spaced notched wheels 36 as full reel transfer means to lift filled reels 10' into an unreeling position. Each of the transfer wheels 36 may be mounted from a suitable shaft means 37 attached to adjacent lower portions of track sections 26, while suitable motor and drive means 38, working through a drive wheel 39, will provide for the partial turning of the wheel 36. As best shown on the elevational view of FIG. 5, each transfer wheel 36 has a notched peripheral portion at 40 which is adapted to be below the level of track 26 in its initial position whereby a filled reel 10' will move along the track sections 26 and have its end pieces 16 be stopped above the notched portions 40. Thus, as the movement of the transfer wheels are initiated, they will pick up and lift the filled reel 10' from the track 26 to carry it over to a further downtrack unreeling position 10U against stops 41 on track sections 26. In this unreeling position 10U, the filled veneer reel is available for having the wound layers of veneer fed onto an adjacent conveyor 42C and carried on downstream to various clippers or cutter means that will in turn effect a cutting of the veneer into desired widths or strips. The dashed line position for wheel 36' and notch means 40' shows how the transfer wheel 36 may be partially rotated to lift and carry a filled reel onto the unreeling position 10U.

As best shown in FIGS. 1 and 4, there are also indicated the utilization of power operated empty reel pickup means, such as arms 42 pivotally mounted to ends of shaft 43 in turn mounted on the sides of the superstructure for track means 26. The shaft 43 may be rotated back and forth through a portion of an arc 42', by means of drive wheel 44 connecting to a power operated drive chain 45, such that socketlike end portions 46 for each of the pickup arms 42 will be adapted to engage the stub end portions 16 for each empty reel at position 10U. As best shown in FIG. 4, each of the pickup arms 42 will have a suitable length from the mounting position on shaft means 43 which will provide for the ultimate discharge of each lifted empty reel 3E to the end of empty reel receiving tracks 47. The latter are in turn, mounted above and parallel to the storage track sections 26.

In a preferred embodiment, the power operating means 38 and 45 for, respectively, the full reel transfer wheels 36 and the pickup arm means 42 have an integrated operation in that each will be operated in a sequential timing whereby the pickup arm means 42 will move upwardly from a lower position to lift an empty reel from position 10U and deposit it on track means 47 to then return to an initial position below the level of track 26 before the transfer wheel means 36 moves a filled reel 10' into position 10U. In other words, the operation or partial rotation of full reel transfer wheels 36 will be initiated at about the end of the cycle or latter part of the downward movement of the empty pickup arms 42 whereby as soon as the latter have removed an empty reel and are back out of the way, then the transfer of a full reel may be completed to deposit a new filled reel at position 10U. subsequent to the depositing of a new filled reel into position 10U, the transfer 36 can return to the position as shown in full in FIG. 5, whereby the notch means 40 will provide a stop for the next in line full reel or track means 26 and, at the same time, have such reel in position for lifting into the unwind position at the next cycle of operations for the empty reel pickup arm means 42 and full reel transfer wheels 36. The timing for the integration of the sequence of operations for power drive means 38 and 45 may be of a conventional nature and it is not deemed necessary that time delay means or electrical circuitry and switching operations be shown and described in the present drawings.

In connection with the return of empty reels back to the zone of the veneer reeling operation, reference may be made specifically to FIG. 6 of the drawing as well as to the sectional elevational views in FIGS. 3 and 4, where there is shown the empty reel receiving track sections 47 capable of carrying empty reel means 3E into an empty reel transfer conveyor 48. Such conveyor extends from across the end of track means 47 to a receiving end of an empty reel storage track section or rack 49. In order to be out of the way of the full reel track and carriage system, the entire empty reel return arrangement is provided at a level spaced thereabove; however, the receiving and storage track sections for the empty reels may be parallel to and substantially directly above track sections for the full reels. Also, in a preferred embodiment, the empty reel transfer conveyor means is of a simplified trough arrangement adapted to handle the reels in an end-to-end position so that the conveyor belt is quite narrow and housed in a lower narrow portion of a troughlike conveyor unit such as 50.

To preclude power means to move an empty reel 3E across track sections 47 there may be a downward sloping of the latter from its receiving end to its discharging end. Also, the latter is positioned at right angles and adjacent to a receiving end portion of the empty reel transfer belt means 48. Thus, as each reel 3E rolls down track section 47 to conveyor belt 48, there will be a lateral transfer of each such reel with respect to the track sections and to the receiving end portion of track means 49 which serves as the storage rack for the empty reels. Again, as best shown in FIG. 3, each of the empty reels 3E should be caused to move to a discharge end of track means 49 by means of a slope in such track sections down to an empty reel tipple arm means 51.

In the plan view, as shown by FIG. 6, there is indicated diagrammatically the utilization of deflection bar means 52 above conveyor belt means 48 and in combination with the discharge end of the conveyor trough means 50 such that as each empty reel approaches the empty reel storage track sections 49 there will be a gradual urging of each such reel from the conveyor belt and the movement of each reel into engagement with the track sections 49. Thus, through the use of roller bearing type wheels 9 on the ends of each reel will engage the upper surface of track means 49 to roll to a roller discharge end thereof. The location or positioning of each deflection bar means 52 in combination with the wheel transfer conveyor means can vary in accordance with the length of empty reels used, as well as with respect to the type and size of antifriction wheels. At the ends of each reel such that there is the coordinated and timed urging of each reel from the transfer belt means 48 onto the track means 49 which, in turn, will normally be at substantially right angles to the transverse conveyor means.

Various types of reel lifting or moving means may be utilized to effect the transfer of each empty reel from track sections 49 to the veneer reeling position 3; however, in a simplified system the empty reel transfer to the reeling zone may be manual rather than power operated. Specifically, as best shown in FIG. 7, there may be a pair of tipple arms 51 which are pivoted at 53 and are of sufficient length to have their arm portions reach the veneer reeling zone 3, as shown by the dashed lines 51'. Also, there is a hooked portion 54 adjacent to and below the pivot point 53 which has an opening or slot portion 55 of a size sufficient to permit engagement of the end portions 16 for each empty reel means, whereby the rotation of the entire tipple arm means 51 through arc means 51'' will effect the lifting of the end most reel means 3E off from the end of track means 49 and then from a resulting upper surface for tipple arm means 51 whereby such reel then rolls downwardly along the surface of each arm member 51 (as shown by the position 51'). Each of the tipple arm means 51 may be attached to a shaft 56 rotating about and passing through pivot points 53 (as shown in FIG. 6) and, at the same time, each tipple arm 51 may be tied together by cross tie bar means 57 whereby they will work in unison to allow each hook section 54 to lift an endmost reel 3E to cause its ultimate rolling and transfer into the reeling position 3. One advantage of the tipple arms 51, together with the hook-type dislodgment means 54, is the fact that such tipple arm means may be maintained out of the way of the platform means in front of the reel receiving veneer from the lathe and away from the reeling operation until such time as it is necessary to move an empty reel into position at the veneer reeling station. However, obviously other types of transfer arrangements, such as sliding track means, or hinged track means, may be used to effect a bridging of the space between the end of track sections 49 and the reeling position 3, and still be within the scope of the overall reel handling system which eliminates the need for overhead hoist means in handling the filled or empty reels in the improved system.

It is also to be noted in connection with the present reel handling system that both the plan views and the elevational sectional views are diagrammatic with respect to the supporting structures or framing and tracks, as well as diagrammatic with respect to the power operated equipment and that various equivalents may well be incorporated. Also, there is no intent to provide any one set of predetermined dimensions or distances with respect to reels, track positions or track spacings. For example, the transverse movement of the carriage section 15 between the track sections for filled reels will be dependent upon the plant layout of conveyor means, such as the "roundings" conveyor and the cut veneer conveyor. Still further, the present embodiment indicates the various track sections, other than the pivoted sections 12, to have fixed positions and relationships with respect to the empty reel transfer conveyor or the filled reel carriage section; however, other portions of track may be made movable by pivoting or other suitable track moving arrangements. Also, track hinging means may be used whereby any particular section of track may be made temporarily movable in a convenient manner, particularly where there may be need for access to a particular piece of equipment.

We claim:

1. A system for the handling of veneer reels where they are used for receiving a facing for veneer plywood from a veneer cutting lathe in a reeling zone, resulting filled reels are transferred to an unreeling zone and emptied reels are transferred back to the veneer reeling zone, with such system comprising in combination:

a. utilizing a wheel with antifriction bearings adjacent each end of each reel used in said system, whereby the reels may be easily rolled on track means having track spacing to engage such wheels, b. power operated full reel lift means adjacent the reeling zone with such means adapted to lift a filled reel from such zone and have the wheels on the ends of the reel roll onto a first portion of track means, and such track means extending to a transversely movable reel carriage section, c. said carriage section having an upper reel support portion with a short track means and reel-stop means combined therewith to thereby receive a filled veneer reel and hold it thereon, d. rollers attached to the lower portion of said carriage section, with such rollers in turn spaced to engage carriage track means positioned to extend substantially transverse with respect to the full reel movement from the reeling zone on said first portion of track means, e. said carriage track means extending to a receiving end of a filled reel storage track, f. power means connecting to said carriage section to move the latter on said carriage track means to a stopped position for a filled veneer reel on said carriage section providing alignment of the reel with the receiving end of said filled reel storage track, g. a lifting means in combination with said upper support portion of said carriage section effective for dislodging and rolling a filled reel from said support portion to said filled reel storage track as the filled reel reaches alignment therewith, h. power operated full reel lifting means adjacent a discharge end of said storage track, with such lifting means having movable dislodging means to fit under each end of a stored reel and effect a periodic transfer of a filled reel to an unreeling position, and i. power operated empty reel lifting means adjacent the unreeling position, with such means having movable arm means providing for the lifting of empty reels from such position whereby empty reels may be removed therefrom and returned to said veneer reeling zone.

2. The handling system of claim 1 further characterized in that said reel support section on said carriage section has a lower rotatable turntable section that is in turn supported on roller means on the carriage section, whereby a supported full reel may be turned at least about 180°.

3. The handling system of claim 2 still further characterized in that drive gear means and toothed rack means are provided between the upper reel support portion of the carriage section and said carriage track means, with said drive gear means being connected to said turntable section, whereby as the carriage section is moved transversely there will be effected an end-for-end turning of a supported filled reel on said upper support portion.

4. The handling system of claim 1 further characterized in that said lifting means in combination with said upper supported portion of said carriage section embodies the combination of a lifting roller means and a sloping track section, with the sloping track section being attached to either the upper support portion or to a portion of the carriage track means while the lifting roller means is attached to the other portion thereof and adapted to engage such track section, whereby the sloping track incline provides a lifting of said upper reel support portion to in turn dislodge the filled reel therefrom for discharge onto said storage track.

5. The handling system of claim 1 further characterized in that said full reel lifting means adjacent the discharge end of said storage track comprise a pair of rotatable and spaced notched wheel members, with each such wheel member being mounted adjacent a portion of the storage track means and on a transverse shaft means, shaft operating means whereby each of the spaced notched wheel members may be rotated in unison at least through an arc, and with the notched portion of each wheel member positioned and arranged in the periphery of each wheel as well as with respect to said storage track elevation whereby each notch will be rotated below the track level and provide for engagement of a filled reel from the storage track such that the subsequent rotation of the wheel members will lift a filled reel from off the track to an adjacent parallel position where each filled reel is in the unreeling position.

6. The handling system of claim 1 further characterized in that power operated empty reel lifting means adjacent the unreeling position provides an arm at each side of the filled reel storage track in a position to have each arm effect a clearance of the track and said full reel lifting means, and each such arm is connected to driving means operative to lift them back and forth through an arc beginning at an initial position below the unreeling position for filled reels, whereby to effect the desired removal of an empty reel from such unreeling position and make room for transfer of a filled reel into said unreeling position.

7. The handling system of claim 1 further characterized in that an empty reel track means and a transverse moving belt conveyor means are provided at a level above the transfer of filled reels to said unreeling position whereby to provide a return of empty reels to said veneer reeling zone, with the empty reel track means comprising an empty reel receiving track section positioned parallel to and at least in part above said full reel storage track, and a second portion of empty reel storage track section positioned parallel to and above said first portion of track means adjacent the veneer reeling zone, and said transverse moving belt conveyor means is positioned at about the same level and transversely to said empty reel track sections, with a receiving end of the conveyor means adjacent an end of said receiving track section and a discharge end of the conveyor means transversely adjacent a receiving end of said empty reel storage track section.

8. The handling system of claim 7 further characterized in that said moving belt conveyor means is maintained in a long narrow trough arrangement and has a continuously moving power operated conveyor belt to carry empty reels in a longitudinal position, said long narrow trough for conveyor means has an open side portion at the receiving end thereof at right angles to said empty reel receiving track section, and the latter is positioned to slope downwardly to the open side portion of the conveyor trough means whereby to provide an inlet for reels.

9. The handling system of claim 7 still further characterized in that moving belt conveyor means has a long narrow trough section with an open side at a discharge end thereof positioned adjacent to and transverse to said empty reel storage track section, and at least one elongated angularly positioned guide bar means in the discharge end of such trough portion of the conveyor means above the belt therein to effect the displacement of each empty reel from the conveyor belt and whereby transversely transferred empty reels may be moved to said empty reel storage track section.

10. The handling system of claim 7 still further characterized in that said empty reel storage track section is sloped from adjacent said moving belt conveyor means to a discharge end which has storage means close to and in alignment with said veneer reeling zone.

11. The handling system of claim 7 still further characterized in that a rotatable tipple arm means is provided at each side of said empty reel storage track, with said tipple arm means having a pivoted connection to such track means and end slot portions to receive end portions of each empty reel, as well as long arm portions of a length suitable to extend from the end of the empty reel storage track section to a point above and adjacent to the veneer reeling position, whereby upon the rotation of said tipple arms they will pick up an adjacent empty reel and let it roll down to the veneer reeling position.